United States Patent
Rochwerger et al.

(10) Patent No.: US 10,375,158 B2
(45) Date of Patent: *Aug. 6, 2019

(54) TECHNIQUES FOR ADAPTIVE TRAFFIC DIRECTION VIA SCALABLE APPLICATION DELIVERY CONTROLLER SERVICES

(71) Applicant: RADWARE, LTD., Tel Aviv (IL)

(72) Inventors: Benny Rochwerger, Zichron Yaakov (IL); Ehud Doron, Moddiin (IL); Kobi Samoray, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,253

(22) Filed: Jul. 1, 2016

(65) Prior Publication Data
US 2017/0006092 A1    Jan. 5, 2017

Related U.S. Application Data

(63) Continuation-in-part of application No. 13/856,679, filed on Apr. 4, 2013, now Pat. No. 9,386,085.

(60) Provisional application No. 61/620,131, filed on Apr. 4, 2012.

(51) Int. Cl.
*H04L 29/08*    (2006.01)

(52) U.S. Cl.
CPC ...... *H04L 67/1023* (2013.01); *H04L 67/1002* (2013.01)

(58) Field of Classification Search
CPC .......................... H04L 67/1023; H04L 67/1002
See application file for complete search history.

(56) References Cited

U.S. PATENT DOCUMENTS

| | | | |
|---|---|---|---|
| 7,203,744 B1 | 4/2007 | Parekh et al. | |
| 7,355,977 B1 * | 4/2008 | Li | H04L 45/00 370/235.1 |
| 8,873,375 B2 | 10/2014 | Kim et al. | |
| 8,958,293 B1 | 2/2015 | Anderson | |
| 9,386,085 B2 * | 7/2016 | Doron | H04L 67/1002 |
| 2004/0215756 A1 | 10/2004 | VanAntwerp et al. | |
| 2007/0079308 A1 | 4/2007 | Chiaramonte et al. | |
| 2007/0115818 A1 * | 5/2007 | Bose | H04L 41/0806 370/230 |
| 2009/0228883 A1 | 9/2009 | Gebhart et al. | |
| 2010/0057923 A1 * | 3/2010 | Petter | G06F 9/5061 709/229 |
| 2011/0153724 A1 * | 6/2011 | Raja | H04L 67/325 709/203 |

(Continued)

FOREIGN PATENT DOCUMENTS

| | | | | |
|---|---|---|---|---|
| WO | WO 03041355 A1 * | 5/2003 | ............. | H04L 29/06 |
| WO | 2007147310 A1 | 12/2007 | | |

*Primary Examiner* — Oanh Duong
(74) *Attorney, Agent, or Firm* — M&B IP Analysts, LLC

(57) ABSTRACT

A system and method for managing an application delivery controller (ADC) cluster including a plurality of ADCs are provided. The method includes creating a hash table including a plurality of buckets, wherein a number of the plurality of buckets is a multiple of a maximum number of active ADCs that can be supported by the ADC cluster; allocating, to each active ADC of the ADC cluster, one of the plurality of buckets; and instructing at least one network element to distribute traffic to and from the active ADCs based on the hash table.

26 Claims, 12 Drawing Sheets

(56) References Cited

U.S. PATENT DOCUMENTS

| | | | |
|---|---|---|---|
| 2011/0277026 A1* | 11/2011 | Agarwal | G06F 21/41 726/8 |
| 2012/0151353 A1 | 6/2012 | Joanny | |
| 2012/0151358 A1 | 6/2012 | Joanny et al. | |
| 2012/0226810 A1 | 9/2012 | Ferdman et al. | |
| 2013/0055010 A1* | 2/2013 | Kotha | G06F 11/203 714/4.11 |
| 2013/0060940 A1* | 3/2013 | Koponen | H04L 12/4633 709/225 |
| 2013/0070762 A1* | 3/2013 | Adams | H04L 49/70 370/389 |

\* cited by examiner

410

| Bucket Number | SIP | |
|---|---|---|
| 1 | X.X.X.01 | VA 400-1 |
| 2 | X.X.X.02 | VA 400-1 |
| 3 | X.X.X.03 | VA 400-1 |
| 4 | X.X.X.04 | VA 400-1 |
| 5 | X.X.X.05 | VA 400-1 |
| 6 | X.X.X.06 | VA 400-1 |
| 7 | X.X.X.07 | VA 400-1 |
| 8 | X.X.X.08 | VA 400-2 |
| 9 | X.X.X.09 | VA 400-2 |
| 10 | X.X.X.10 | VA 400-2 |
| 11 | X.X.X.11 | VA 400-2 |
| 12 | X.X.X.12 | VA 400-2 |
| 13 | X.X.X.13 | VA 400-2 |
| 14 | X.X.X.14 | VA 400-2 |
| 15 | X.X.X.15 | VA 400-3 |
| 16 | X.X.X.16 | VA 400-3 |
| 17 | X.X.X.17 | VA 400-3 |
| 18 | X.X.X.18 | VA 400-3 |
| 19 | X.X.X.19 | VA 400-3 |
| 20 | X.X.X.20 | VA 400-3 |
| 21 | X.X.X.21 | VA 400-4 |
| 22 | X.X.X.22 | VA 400-4 |
| 23 | X.X.X.23 | VA 400-4 |
| 24 | X.X.X.24 | VA 400-4 |
| 25 | X.X.X.25 | VA 400-4 |
| 26 | X.X.X.26 | VA 400-4 |
| 27 | X.X.X.27 | VA 400-5 |
| 28 | X.X.X.28 | VA 400-5 |
| 29 | X.X.X.29 | VA 400-5 |
| 30 | X.X.X.30 | VA 400-5 |
| 31 | X.X.X.31 | VA 400-5 |
| 32 | X.X.X.32 | VA 400-5 |

| Bucket Number | SIP | |
|---|---|---|
| 1 | X.X.X.01 | VA 400-1 |
| 2 | X.X.X.02 | VA 400-1 |
| 3 | X.X.X.03 | VA 400-1 |
| 4 | X.X.X.04 | VA 400-1 |
| 5 | X.X.X.05 | VA 400-1 |
| 6 | X.X.X.06 | VA 400-1 |
| 7 | X.X.X.07 | VA 400-6 |
| 8 | X.X.X.08 | VA 400-2 |
| 9 | X.X.X.09 | VA 400-2 |
| 10 | X.X.X.10 | VA 400-2 |
| 11 | X.X.X.11 | VA 400-2 |
| 12 | X.X.X.12 | VA 400-2 |
| 13 | X.X.X.13 | VA 400-2 |
| 14 | X.X.X.14 | VA 400-6 |
| 15 | X.X.X.15 | VA 400-3 |
| 16 | X.X.X.16 | VA 400-3 |
| 17 | X.X.X.17 | VA 400-3 |
| 18 | X.X.X.18 | VA 400-3 |
| 19 | X.X.X.19 | VA 400-3 |
| 20 | X.X.X.20 | VA 400-6 |
| 21 | X.X.X.21 | VA 400-4 |
| 22 | X.X.X.22 | VA 400-4 |
| 23 | X.X.X.23 | VA 400-4 |
| 24 | X.X.X.24 | VA 400-4 |
| 25 | X.X.X.25 | VA 400-4 |
| 26 | X.X.X.26 | VA 400-6 |
| 27 | X.X.X.27 | VA 400-5 |
| 28 | X.X.X.28 | VA 400-5 |
| 29 | X.X.X.29 | VA 400-5 |
| 30 | X.X.X.30 | VA 400-5 |
| 31 | X.X.X.31 | VA 400-5 |
| 32 | X.X.X.32 | VA 400-6 |

FIG. 4B

TECHNIQUES FOR ADAPTIVE TRAFFIC DIRECTION VIA SCALABLE APPLICATION DELIVERY CONTROLLER SERVICES

CROSS-REFERENCE TO RELATED APPLICATIONS

This application is a continuation-in-part of U.S. patent application Ser. No. 13/856,679 filed on Apr. 4, 2013, now allowed, which claims the benefit of U.S. Provisional Patent Application No. 61/620,131 filed on Apr. 4, 2012. All of the applications referenced above are hereby incorporated by reference.

TECHNICAL FIELD

The disclosure generally relates to service providers networking environments, and more particularly to techniques for optimizing hash tables utilized for flow processing.

BACKGROUND

Cloud-computing and cloud-based services occupy a fast growing slice of the market. One of the main benefits of the cloud service is being able to "consume exactly what you need", i.e., services are consumed on demand. As a result, there is no need to purchase dedicated IT infrastructure (e.g., servers, network devices, and storage) sized for the maximum foreseeable utilization, which will still incur fixed operational expenses in addition to the initial capital expenditures for the equipment, but will be idle for most of the time.

One of the common cloud business models is payment for the actual utilization of computing resources at each point in time (also known as "pay as you go"). In implementation, the number of virtual machines (VMs) that are actually in use, the computing capacity (memory, CPU, and the like) of such virtual machines, and the volume of traffic flowing between the "cloud" and the outside world (WAN/Internet) is measured to determine the utilization of computing resources to ascertain the actual cost for the customers.

The main requirement in such services is providing, for each of a large number of concurrent tenants, high variability in the required capacity, i.e., between different services and especially within the same service at different points in time. Tenants are customers that deploy services in the same cloud. For example, a service that deals with last-minute sales or events at specific points in time requires very high capacity at peak times, and almost zero resources at other times.

As a consequence, such cloud services must be highly scalable and dynamically adaptive to match the requirements of all cloud-customers at any given point in time, as the resources per each cloud-customer are allocated to fit the actual and current needs of the tenant. The combination of these requirements is also known as elasticity.

One of the computing resources utilized in datacenters, and hence in cloud-computing environments, is an application delivery controller (ADC). An ADC is a network device installed in a datacenter or multi-datacenter system to remove load from web servers in the datacenter. That is, an ADC typically distributes clients' requests between the web servers in a datacenter to balance the load. In a multi-datacenter system, an ADC is deployed in each datacenter to redirect clients' requests to a datacenter that would best serve such requests. Typically, the redirection decision is based on the location of the client from the datacenter. The ADC is a network device and, as such, includes computing resources, such as memory, one or more central processing units (CPU), storage, network connectivity, and so on.

Virtual instances of an ADC device can improve the performance of datacenters while reducing costs and overhead to the service providers. Similar to any other data center application, the ADC devices of different customers or applications can be consolidated as multiple virtual ADC instances running on a single hardware device.

Although virtual ADCs provide flexibility in terms of the number of virtual instances, as well as computing resources that can be allocated or de-allocated within a physical device to provide ADC services, the capacity of a virtual ADC is typically limited by the computing resources of the physical device hosting the virtual instances. The computing resources include computing power (e.g., number of CPU cores), bandwidth, memory, and the like.

In order to increase the capacity when providing ADC services, some existing solutions suggest clustering a number of physical ADC devices. An example diagram of such a cluster 100 is provided in FIG. 1. In this example, three physical ADC devices 110, 111, and 112 are connected to a client network through a switch 120, and to the server network (in the datacenter) through a switch 130. The cluster illustrated in FIG. 1 requires a backplane switch 140 to allow communication between all the devices 110, 111, and 112. The switches 120, 130, and 140 are network switches. The traffic distribution in the cluster 100 is performed based on link aggregation (LAG) provisioning of the switches 120 and 130.

The cluster 100 suffers from a number of limitations, one of which is that all of the ADC devices 110, 111, and 112 should have the same capacity. Another limitation is that any change to the initial configuration of the cluster 100 requires implementing an ADC persistence correction process using the backplane switch 140, which is mainly added for this purpose. Furthermore, any ADC device added to the initial cluster must be connected to the backplane switch 140 and any traffic routed to such an ADC device must first pass through any of the ADC devices 110, 111, and 112. This is performed in order to comply with the initial LAG distribution function with which the cluster is configured. Yet another limitation of the cluster 100 is that the switches 120, 130, and 140 should be physically co-located near the ADC devices 110, 111, and 112.

As a result of the limitations of conventional ADC clustering techniques, current solutions cannot efficiently support elasticity of ADC services. That is, the cluster 100 may not be dynamically adapted to provide additional or less capacity for ADC services on-demand. In cloud-computing environments, high availability and elasticity of the supplied services are essential.

In an attempt to cure this deficiency, a DNS-based elasticity technique can be utilized. In such a technique, a DNS is utilized to distribute the load among the ADC devices in the cluster. However, this technique also suffers from some drawbacks including, for example, poor adaptability, performance, and latency. The poor adaptability results from the fact that DNS responses are cached and it takes a long time to respond to changes in the cluster configuration. Thus, an ADC may become overloaded or completely unavailable in the interim since the last time the DNS server returned its IP address to the client. Trying to solve the poor adaptability issue by setting the time-to-live (TTL), would create a performance bottleneck around the DNS server due to the ensuing flood of requests and also requires more computing capacity. An attempt to solve the performance issue would increase the latency per connection setup, because of the DNS roundtrip prior to the connection setup.

Additionally, although hash tables may be applied to existing solutions to assign flows to clusters of ADCs, such hash tables use amounts of computing resources, particularly for hash tables including larger amounts of data. Moreover, existing solutions are not readily adaptable to differences in ADC capacities or in clusters of ADCs. Thus, such existing solutions face challenges in adapting hash tables based on dynamic capacity adjustments in ADC services.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for managing an application delivery controller (ADC) cluster including a plurality of ADCs. The method comprises: creating a hash table including a plurality of buckets, wherein a number of the plurality of buckets is a multiple of a maximum number of active ADCs that can be supported by the ADC cluster; allocating, to each active ADC of the ADC cluster, one of the plurality of buckets; and instructing at least one network element to distribute traffic to and from the active ADCs based on the hash table.

Certain embodiments disclosed herein also include a system for managing an application delivery controller (ADC) cluster including a plurality of ADCs. The system comprises: a processing unit; and a memory, the memory containing instructions that, when executed by the processing unit, configure the system to: create a hash table including a plurality of buckets, wherein a number of the plurality of buckets is a multiple of a maximum number of active ADCs that can be supported by the ADC cluster; allocate, to each active ADC of the ADC cluster, one of the plurality of buckets; and instruct at least one network element to distribute traffic to and from the active ADCs based on the hash table.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 4A and 4B are example hash tables generated according to an embodiment.

DETAILED DESCRIPTION

Figure 1:
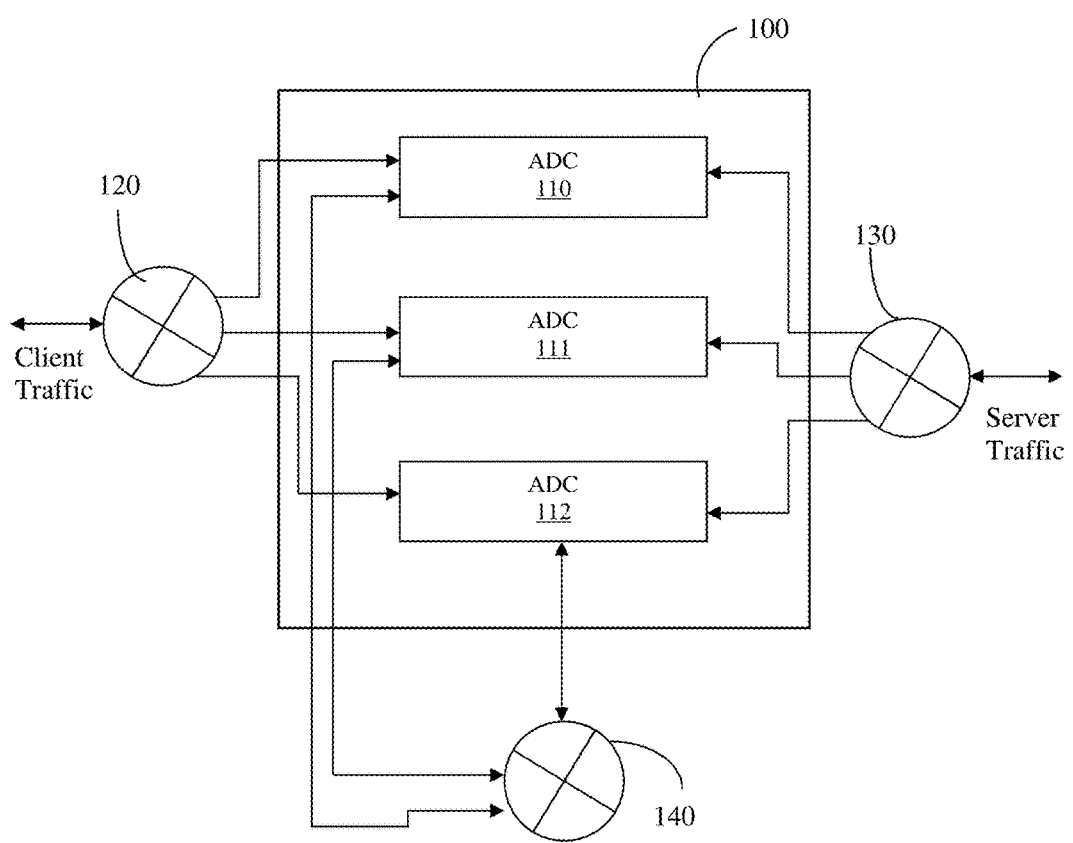
FIG. 1 is a diagram illustrating a conventional ADC clustering solution.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Various embodiments disclosed herein include techniques for optimizing hash tables and, in particular, optimizing hash tables utilized as flow tables in networks supporting multiple match tables. Such networks may include, but are not limited to, networks utilizing, e.g., OpenFlow protocol version 1.3 or later.

Figure 2:
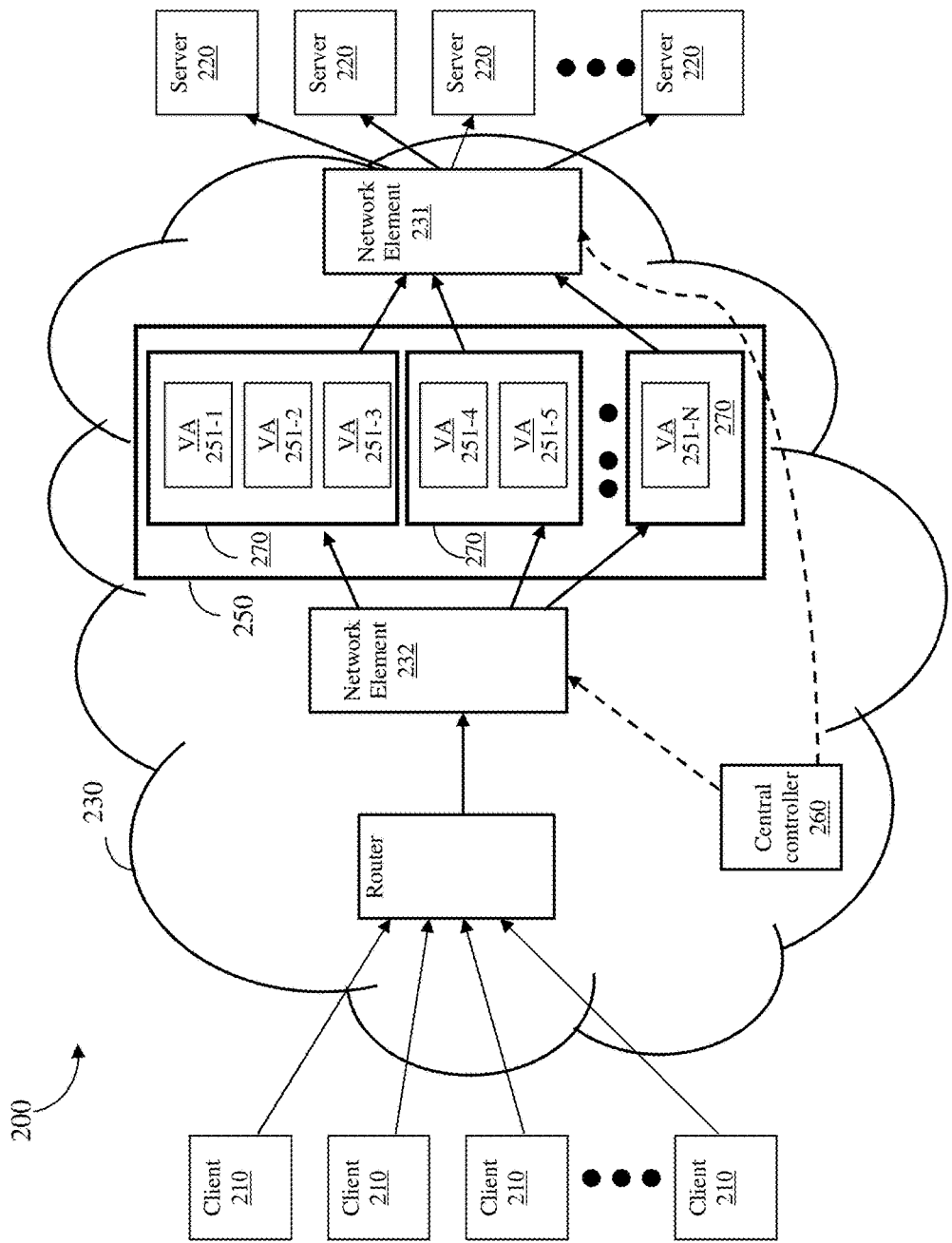
FIG. 2 is a diagram of a network system utilized to describe the various disclosed embodiments.

FIG. 2 shows an example diagram of a network system 200 utilized to describe various embodiments disclosed herein. In the network system 200, a plurality of clients 210 receive services from a plurality of servers 220. The clients 210 and the servers 220 are communicatively connected through a network 230. The network 230 may be a software defined networking (SDN) based network or a combination of an SDN-based network and another network (e.g., a network defined based on hardware).

The SDN is a networking architecture that provides centralized management of network elements. In the SDN, a network element follows networking operations, such as routing decisions, received from a central controller. The SDN can be implemented in wide area networks (WANs), local area networks (LANs), the Internet, metropolitan area networks (MANs), internet service provider (ISP) backbones, datacenters, and the like. A SDN-based network element is typically a switch that routes traffic according to the control of a central controller. The SDN may also include hardware such as routers, switches, bridges, load balancers, and so on, as well as any virtual instantiations thereof.

The network 230 may also be a combination of a hardware-based IP network that includes conventional routers and switches with SDN-based network elements controlled by a central controller. To allow the proper operation of the disclosed techniques in a hybrid network, at least one network element being programmable by the central controller should be connected to an ADC cluster 250.

The servers 220 are connected to the ADC cluster 250 through a network element 231 (which is referred to as an egress network element or a server-side network element). The ADC cluster 250 receives clients' traffic through a network element 232 (which is referred to as an ingress network element or a client-side network element). The ADC cluster 250 is configured according to various embodiments disclosed herein and includes a plurality of VAs 251-1 through 251-N (hereinafter referred to individually as a VA 251 and collectively as VAs 251, merely for simplicity purposes). The VAs 251 are hosted in one or more physical devices 270. A device 270 may be a generic physical machine (e.g., a server) or a physical ADC. It should be noted that the devices 270 in the cluster 250 may have different capacities and the VAs may be configured with different capacities.

The VAs 251 distribute the load among the servers 220, and can perform additional service delivery tasks such as SSL offloading, content-based routing, connection pooling, and the like. The ADC cluster 250 is addressed by MAC and IP addresses. In one embodiment, a single virtual service is provided by the ADC cluster 250. With this aim, in a further embodiment, a single VIP may be utilized for the purpose of communication with the VAs 251 in the cluster 250. That is, the clients 210 may direct a request to a single VIP. It should be noted that the disclosed embodiments utilizing VIPs are merely examples and other embodiments may be utilized equally without a VIP according to the scope of the disclosure.

According to one embodiment, a central controller 260 is configured to dynamically control and manage the setting of the ADC cluster 250. This control and management includes adding and removing VA instances and/or devices 270 based on the current load of the devices 270. In one embodiment, the controller 260 is configured to monitor the health of the VAs 251 and the devices 270 to determine their operational status, i.e., up and down. Based on the determined operational mode, the controller 260 is configured to maintain a list of active ADCs (VAs and devices). In a case of a failure in one VA or device, the controller 260 is further configured to switch over to a different VA or device by migrating its current state and connections as well as managing the traffic distribution in the new cluster configuration. Various techniques for monitoring the health or load of the VAs 251 are described further herein below.

According to another embodiment, the central controller 260 implements the traffic distribution process to balance the incoming traffic load among all the VAs 251 in any configuration of the ADC cluster 250. The traffic distribution process ensures that a balanced traffic distribution is achieved when VAs 251 and/or devices 270 are added to or removed from the ACD cluster 250. The traffic distribution is performed using a hash table implementation as described in greater detail herein below.

In one configuration, the network elements 231 and 232, as well as the central controller 260 are SDN-based components. In such a configuration, the network elements 231 and 232 communicate with the central controller 260 using, for example, an OpenFlow protocol. The OpenFlow protocol allows for adding programmability to the network elements 231 and 232 for the purpose of packets-processing operations under the control of the controller 260, thereby allowing the central controller to define the traffic handling decisions in the network element. As will be discussed below, the controller 260 is configured to program the network elements 231 and 232 to allow a customized traffic distribution with connection persistency. That is, all of the packets of a single connection are eventually handled by the same VA and consequently by the same server, all at wire speed. The protocols between the clients 210 and the server 220 can be any client-server protocol such as, for example, Web servers using the HTTP protocol.

It should be noted that, in one embodiment, the infrastructure of the system 200 can be completely virtualized for both the servers 220 and the devices 270. The server's environment is virtualized using one or more VMs. As noted above, a device 270 can also execute one or more virtual ADC instances, i.e., the VAs 251.

According to another embodiment, the infrastructure of the system 200 is of a service provider physical network. In such a configuration, the ADC cluster 250 can be built to include physical ADC devices without any virtual ADCs instances. The ADC cluster 250, in this embodiment, can be utilized to provide high capacity ADC services by aggregation of a plurality of ADC devices.

The following is a non-limiting example for a traffic flow in the network system 200. An incoming packet from a client 210 is received at the network element 232. The network element is programmed by the central controller 260 to pass the incoming packet to a destination VA, e.g., the VA 251-3, according to the source IP address (i.e., the client's 210 IP address). The destination VA (e.g., 251-3) is selected, in part, using the hash table discussed below. The destination VA (e.g., 251-3) sends the request to one of the servers 220 based on the ADC service that server 220 is configured to execute.

In the opposite direction, an outgoing packet sent by a server 220 (e.g., a server response) always arrives at the same VA (e.g., VA 251-3) that handled the client's incoming packet. With this aim, in one embodiment, a source network address translation (NAT) is utilized by the destination VA (e.g., VA 251-3) to translate the client IP address to its own IP address, thereby enabling subsequent responses to arrive at the destination VA's IP address. In another embodiment, described in further detail herein below, a hash function is performed on the destination IP address (included in response packets), which is the IP address of a client 210.

In one embodiment, the central controller 260 is configured to program the ingress network element 232 to send incoming packets from a client 210 to one of the VAs 251 (e.g., the VA 251-1) based on the client's 210 source IP address. The central controller 260 is also configured to program the egress network element 231 to send outgoing packets from the server 220 to the VA 251 that forwarded the respective incoming packet.

In addition, the central controller 260 is configured to program the network elements to implement the hash table operations used for clients' traffic distribution among VAs 251. In addition, the controller 260 is configured to perform health checks to make sure the VAs are functional. One or more VAs 251 found to be down are removed from the flows and no traffic is redirected to such VAs.

As noted above, the traffic distribution process performed by the central controller 260 determinates and selects, using a hash table implementation, the destination VA 251 based on the client's IP address. This selection minimizes the number of connections and sessions that are affected by any changes in the cluster size of the ADC cluster 250. That is, the selection minimizes the effects of changes when, e.g., adding a new VA or removing a VA that was either planned due to, for example, a user request or unplanned due to failure. Further, persistency may be preserved by configuring the VAs 251 with a set of persistency rules. Example persistency rules are described further herein below. Additionally, such selection ensures symmetry, i.e., that the traffic is handled by the same ADC instance whether being delivered from the client to the server or from the server to the client.

Figure 3:
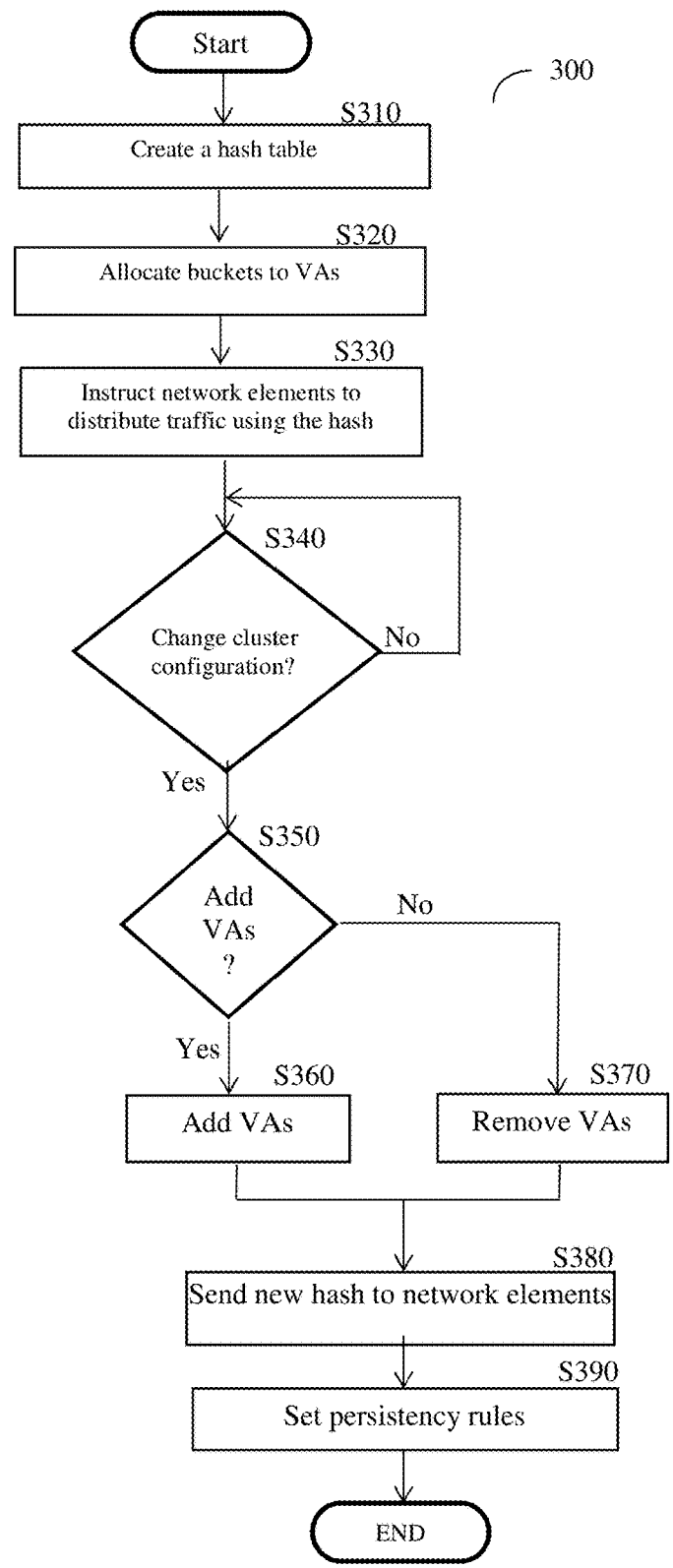
FIG. 3 is a flowchart illustrating a method for controlling and managing an ADC cluster according to an embodiment.

FIG. 3 shows example flowchart 300 illustrating the operation of the central controller 260 according to an embodiment. The central controller 260 is configured to manage and control the ADC cluster 250 as well as to program the network elements 231 and 232 with the traffic distribution process for a balanced distributing clients' traffic between active VAs 251 in the ADC cluster 250. The capacity of the VAs 251 and the devices 270 may be different from each other.

At S310, a hash table is created to allow implementation of the hash operations by the network elements 231 and 232. The hash table includes a number of M buckets, each bucket relating to a range of source IP addresses, i.e., IP addresses of the clients 210. In order to achieve balanced traffic distribution in any load conditions, the number of buckets M in the hash table is a multiplication of the maximum number of active VAs (Nmax) that can be supported in the cluster 250. In an example embodiment, the number of buckets M may be computed using equation 1 as described further herein below with respect to FIG. 6.

In a further embodiment, M is a power of 2. In yet a further embodiment, M is at least 2. In an example embodiment, the number of buckets (M) is 8 times the number Nmax. For example, the hash table includes 256 buckets when Nmax equals 32. The larger the multiplier and, consequently, the number of buckets M, the less disruption caused by changes in load conditions.

In an embodiment, the hash table may be created such that the hash table is adaptable to different capacities, numbers of clusters, and/or numbers of VAs. In a further embodiment, the hash table may be created via a direct mapping allocation, a single indirect mapping allocation, or a double indirect mapping allocation. The various embodiments for direct and indirect mapping allocation for creating hash tables is described further herein below with respect to FIGS. 6-11.

At S320, the buckets in the hash table are allocated to VAs 251, where each bucket is allocated to one specified active VA. The allocation is performed proportionally to the number of active VAs 251 and their respective capacities.

In one embodiment, when all devices 270 have equal capacity, the allocation of buckets to each active VA is computed by dividing the total number of buckets by the number of active VAs, truncated to the closest integer. That is, the number of buckets allocated to each VA 251 is computed as follows:

$$\left\lfloor \frac{M}{N} \right\rfloor; \text{ or } \left\lfloor \frac{M}{N} \right\rfloor + 1$$

where M is the total number of buckets and N is the number of active VAs.

For example, if M=32 and N=5, then two VAs are allocated with 7 buckets and three VAs with 6 buckets. An example hash table 410 representing such an allocation is provided in FIG. 4A.

In another embodiment, the ADC cluster 250 includes one or more non-equal capacity VAs, where the various VA capacities are integer multiplications of the capacity of VA with the lowest capacity, hereinafter referred to as a "basic capacity unit". The parameter C is a total capacity in terms of multiplications of a basic capacity unit. That is, the number of buckets allocated to each VA 251, can be computed as follows:

$$K \times \left\lfloor \frac{M}{C} \right\rfloor; \text{ or } K \times \left\lfloor \frac{M}{C} \right\rfloor + 1$$

where K is the multiplication of the basic ADC capacity for the specific VA.

As a non-limiting example: 3 VAs are configured to support the following capacities: VA 251-1=20 Giga bytes per second (Gbps), VA 251-2=80 Gbps, and VA 251-5=40 Gbps. Accordingly, the basic capacity unit is 20 Gbps and the VAs capacity units are as follows: VA 251-1=1 unit; VA 251-2=4 units; and VA 251-5=2 units, where the total capacity C is C=1+4+2=7 units. Therefore, VA 251-1 is allocated with 5 buckets, VA 251-2 with 17 buckets, and VA 251-5 with 10 buckets.

Once the hash table is created, at S330, the network element (e.g., element 232) is instructed as to which VA to direct traffic received from a client 210. The instruction includes a matching rule and an action rule. The matching rule requires that a predefined number of lowest bits (or suffix) of the source IP address of the incoming packet (from client 210) is matched against the hash table to find the respective bucket and the allocated VA.

For example, referring to the hash table 410 in FIG. 4A, the packet having a source IP (SIP) address x.x.x.1 is directed to a VA 400-1. In an example embodiment, the matching is against the 8 lower bits in the SIP (e.g., '1'). The matching rule provides an implementation of the hash table created by the controller 260. In another embodiment, the controller 260 can provide the network element with the hash table. The action rule ensures that incoming packets reach the designated VA. In one example embodiment, this can be accomplished by exchanging the destination MAC address designated in the incoming packet to the MAC address of the selected VA. In another embodiment, the action rule requires encapsulating the incoming packets with a layer 2 or layer 3 (L2 or L3 of the OSI model) parameters towards the designated VA.

At S330, the network element 231 is instructed to return the packets returned from a server 250 to the same VA that handles the respective incoming packets. In an embodiment, the instruction includes a matching rule and an action rule. The matching rule requires matching a predefined number of lowest bits (or suffix) of the destination IP address of packets received from a server 250 to the hash table to find the respective VA. For example, packets from the server having a destination IP address of 'x.x.x.1' are directed to VA 400-1 according to the example hash table 410. The action rule ensures that outgoing packets reach the designated VA, e.g., by exchanging the MAC addresses. The matching rule provides an implementation of the hash table created by the controller 260.

In order to support elasticity in ADC services, at S340, it is checked if the configuration of the ADC cluster 250 should be modified to add or remove at least one VA. Such modification may be triggered as a result of a user (e.g., a system administrator) command, for cases of ADC services SLA updates, or based on the load and health monitoring performed by the central controller 260.

According to the disclosed embodiments, the load monitoring includes a check if the current average load of the ADC cluster (hereinafter the "ADC load") is above a predefined peak-threshold or below a predefined low-threshold. In an example embodiment, the current processing load is computed as the average CPU (or processor) load of all VAs in the cluster 250. That is, in an embodiment:

$$\text{Cluster\_Load} = \frac{1}{N}\sum_i VA_i CPULoad$$

where, $VA_i$ CPU Load is the average processing load (e.g., CPU utilization) of a single VA in the cluster 250.

The low-threshold represents low utilization of processing power in the cluster 250, while peak-threshold represents high utilization of processing power in the cluster 250. According to one embodiment, when the Cluster_Load is below the low-threshold, at least one VA is removed from the cluster 250, and when the Cluster_Load exceeds the high-threshold, at least one VA is added to the cluster 250. The number of VAs to add or remove may be predetermined by the user or set as a function of the difference between the Cluster_Load and the respective threshold.

If S340 results with a yes answer, execution continues with S350; otherwise, execution waits at S340 to continue the monitoring of the ADC cluster. At S350, it is further checked if at least one VA should be added. If so, execution continues with S360; otherwise, execution continues with S370.

At S360, a process of adding VA(s) is performed. At S370, a process of removing VA(s) is performed. In an embodiment, both S360 and S370 further include modifying the hash table to account for the changes in the configuration of the ADC cluster.

It should be noted that instantiation of new VAs or deleting VAs may be performed under the control of the controller 260 rather than being performed by the controller 260 directly. That is, the central controller 260 is configured to instruct a virtual machine manager (not shown) or the physical ADC device to instantiate a new VA or revoke a VA.

In one embodiment, S360 includes changing the buckets' allocation to ensure that newly added VAs and other active VAs will be allocated. The number of allocated buckets per VA is determined based on the following functions:

$$\left\lfloor \frac{M}{N+p} \right\rfloor; \text{ or } \left\lfloor \frac{M}{N+p} \right\rfloor + 1.$$

where M is the number of buckets, N is the number of current active VAs, and p is the number of newly added VAs.

As a non-limiting example, the ADC cluster 250 initially includes 5 VAs (N=5), where each VA is initially allocated with $$\left\lfloor \frac{M}{N} \right\rfloor \text{ or } \left\lfloor \frac{M}{N} \right\rfloor + 1$$

buckets. When it is required to add a single VA to the ADC cluster 250, each VA in the cluster should be allocated with $$\left\lfloor \frac{M}{N+1} \right\rfloor \text{ or } \left\lfloor \frac{M}{N+1} \right\rfloor + 1.$$

That is, only $$\left\lfloor \frac{M}{N+1} \right\rfloor$$

buckets are allocated from existing VAs to the single new added VA. For example, if there is equal ADC capacity in the cluster 250 with a number of VAs N=5 and a number of buckets M=32. Then, a number of 3 VAs are allocated with 6 buckets and a number of 2 VAs are allocated with 7 buckets. When a new VA is added, the new number of active buckets N+1=6, thus a total number of 5 buckets from the current existing 5 VAs are allocated to the new added VA. Therefore, a number of 4 VAs are allocated with 5 buckets and a number of 2 VAs are allocated with 6 buckets. It should be appreciated that the number of changes to the hash table is bounded by a number equal to $$\left\lfloor \frac{M}{N+1} \right\rfloor.$$

In order to allow minimal changes in bucket allocation, the buckets to be allocated to the newly added VAs are first selected from VAs with extra bucket(s) relative to other VAs. Then, buckets from all other VAs are allocated to the new VA. That is, each VA can potentially contribute one or more buckets to a new added VA, with the constraint to keep on the number of buckets allocated to each VA is as described above. An example hash table 420 showing the new allocation of buckets to a new VA 400-6 is depicted in FIG. 4B. As can be compared to the hash table 410 shown in FIG. 4A, bucket numbers 7, 14, 20, 26 and 32 are now allocated to a new VA 400-6. These buckets are de-allocated from VAs 400-1, 400-2, 400-3, 400-4, and 400-5 respectively.

In one embodiment, S370 includes changing the buckets' allocation so that the buckets allocated to the deleted VAs will be allocated to the rest of the active VAs. The number of allocated buckets per active VA is determined based on the following functions:

$$\left\lfloor \frac{M}{N-p} \right\rfloor; \text{ or } \left\lfloor \frac{M}{N-p} \right\rfloor + 1$$

The parameter M is the number of buckets, N is the number of current active VAs, and p is the number of the removed (deleted) VAs. The buckets of the deleted VAs are first allocated to VAs without an extra bucket relative to other VAs. Then, remaining buckets from deleted VAs are allocated to the other active VAs. That is, each VA accepts at least one bucket from the deleted VA(s). The new bucket allocation for fewer VAs is also proportional to the capacity of each active VA.

At S380, the network element 232 and optionally the network element 231 are programmed with the modified hash table. This enables the network elements 231 and 232 to direct incoming and outgoing packets based on the modified hash table. At S390, when one or more VAs is added or deleted, VAs 251 affected by the new configuration of the cluster 250 are configured with one or more persistency rules.

In one embodiment, the persistency rules determine that if a VA receives a packet having a source IP address of a bucket previously owned by another VA, then the VA processes this packet only if it belongs to an existing session owned by it (e.g., a session that is not defined in its session table), if it belongs to a new session, or if the packet is a "signed packet"; otherwise, the packet is sent to the VA that previously owned the bucket. Similarly, a VA that previously owned a bucket now allocated to a new VA, is configured with a persistency rule to "sign" and send packets that belong to a new session or that do not belong to an existing session (e.g., a session that is not defined in its session table), to the new VA that currently owns the bucket to which the source IP address belongs. A non-limiting example for signing a packet may include modifying the packet header. In a further embodiment, the persistency rules are set to expire after a preconfigured time interval. The central controller 260 further informs each relevant VA about the bucket ownership updates.

Additional example persistency rules are further described with reference to FIG. 4B. The example persistency rules described with respect to FIG. 4B are backup persistency rules which may be utilized to further increase the likelihood that a packet will arrive at the intended VA 400 even in the event that, e.g., the persistency rules described with respect to FIG. 4A are not utilized or an error occurs resulting in receipt of a packet by an unintended VA. If a packet addressed with a SIP "x.x.x.7" allocated for bucket number 7 arrives at VA 400-6 (which is the new VA), then the VA 400-6 processes the packet and checks if the received packet exists in its session table or if it belongs to a new session. If neither, the VA 400-6 forwards the packet to the VA 400-1 which owned bucket number 7 before the hash table was modified (see FIG. 4A). If the packet addressed with a SIP "x.x.x.7," arrives at VA 400-1, then the VA 400-1 processes that packet only if it exists in its session table; otherwise, the VA 400-1 forwards the packet to VA 400-6 which currently owned bucket number 7.

It should be appreciated that the structure of the hash table (i.e., the buckets and their allocation) and hash functions utilized for adapting the allocation, ensures minimal changes to the hash table and, therefore, to the flow mapping. In addition to the structure of the hash table, the persistency rules defined above improve connection persistency, which requires that all packets pertaining to the same layer-4 (of the OSI model) connection arrive at the same VA instance.

Referring back to FIG. 2, as noted above, the central controller 260 is configured to constantly monitor the health condition of the VAs 251 so that only active VAs handle the traffic. The central controller 260 can also initiate checking the health status of the servers 220, thereby enabling the VAs 251 to distribute traffic only among active servers. According to one embodiment, all VAs are required to actively issue address resolution protocol (ARP) requests (or similar requests) to their default gateway for a period of time (e.g., 1 second).

The network element 232 is configured to forward the packet to the central controller 260. After the predefined period of time without ARP reception, the controller 260 treats the unresponsive VA as failed. Other health monitoring commands include sending a dedicated health monitoring request from the controller 260 to the VAs in the cluster. Each VA receiving such a command reports its overall health condition.

In another embodiment, a passive health monitoring is performed. That is, when a VA stops forwarding traffic towards the client 210 for a predefined period of time (e.g., 1 second), the controller 260 initiates a proactive health check of that VA. An example of such a health check is an ICMP echo (ping) packet, but other checks may be equally utilized as would be apparent to one of ordinary skill in the art without departing from the scope of the disclosure.

In yet another embodiment, each active VA can be configured to monitor the health condition of a partial group of the servers 220. Each VA reports the condition of the monitored VAs to the controller 260. The controller 260 updates all active VAs 251 with the overall conditions of all of the servers 220, thereby allowing the VAs to decide to which of the servers' 220 packets should be forwarded.

It should be noted that, although two network elements 231 or 231 are depicted in FIG. 2, the embodiments disclosed herein can be applied to a plurality of clients and servers communicating through multiple SDN-network elements and native network elements. Furthermore, the devices 270 may not be physically co-located near the network elements 231 and/or 232. That is, the devices 270 and their VA instances can be distributed in the network 230. Each group of distributed VA instances may be connected to an SDN-based network element, which directs traffic to VAs under the control of the controller 260 as discussed in detail above.

In an example deployment, a single SDN-based network element can handle ingress and egress traffic from a cluster of VAs. In another example deployment, multiple SDN-based network elements can be connected to the input and output of the VAs. The controller 260 is configured to create the same flows on all network elements regardless of the deployment.

The disclosed embodiments can also be utilized for exchanging ADC devices (e.g., devices) in a single operation. Accordingly, a backup ADC device is exchanged with an active ADC device by merely assigning the buckets of the current active ADC device to the backup ADC device. Then, the active ADC can be shut down. The exchange operation may be required for, for example, maintenance purposes.

Figure 5:
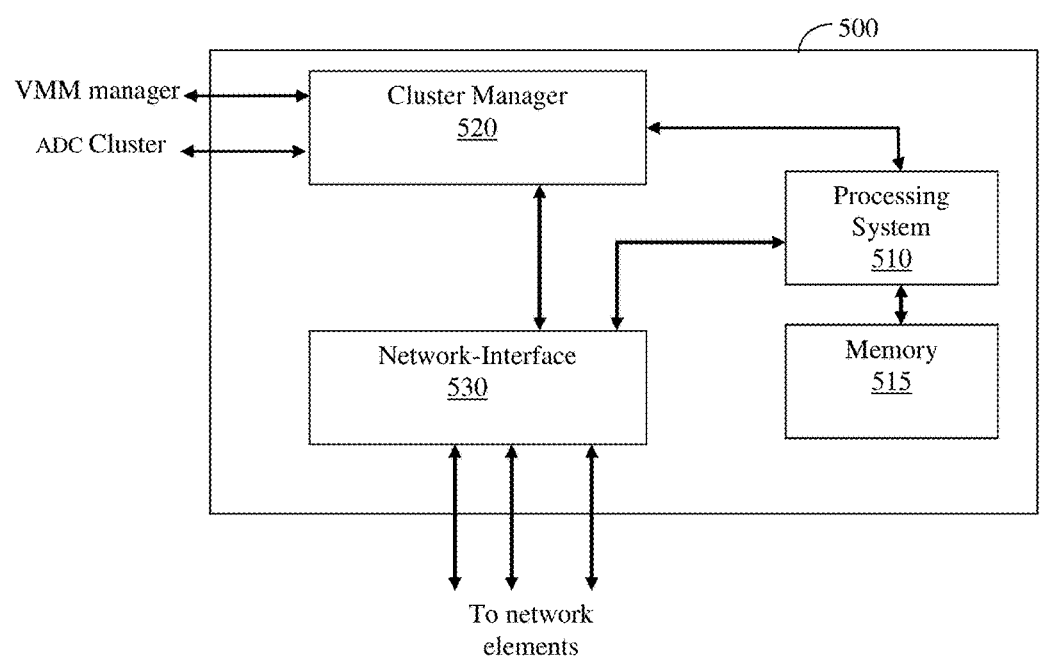
FIG. 5 is a block diagram of a central controller according to an embodiment.

FIG. 5 shows an example block diagram of the central controller 500 constructed according to one embodiment. The central controller 500 is operable in SDN-based networks and networks that are combinations of hardware-based IP networks and SDN-based networks. The controller 500 is configured to at least execute the methods described in greater detail herein above.

The central controller 500 includes a processing system 510 coupled to a memory 515, a cluster manager 520, and a network-interface 530. The memory 515 contains instructions that can be executed by the processing system 510. The instructions, when executed by the processing system 510, cause the controller 260 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 510 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The cluster manager 520 is configured to dynamically control and manage the configuration of the ADC cluster. With this aim, the cluster manager 520 is configured to determine if VA instances and/or devices should be added or removed from the cluster based on the current load of the cluster and the operational status of each VA and device in the cluster. In one embodiment, the cluster manager 520 communicates directly with the devices in the ADC cluster and may also communicate with a virtual machine manager (not shown).

The cluster manager 520 is further configured to perform the traffic distribution functions discussed above. This includes creating the hash table and updating the hash table based on the changes in the active ADCs, creating the persistency rules, and generating a set of instructions for the network elements to enable proper selection of the VA. In an embodiment, the cluster manager 520 may be realized as a processing system including one or more of the hardware elements discussed above.

The network-interface 530 is further configured to allow for communication with the network elements that communicate with the ADC cluster. The communication is performed in part to allow the hash function operations by instructing the network elements to select one VA to allow equal traffic distribution in the cluster. In one embodiment, such communication uses, for example, the OpenFlow protocol discussed above, through a secure channel established with each network element.

Figure 6:
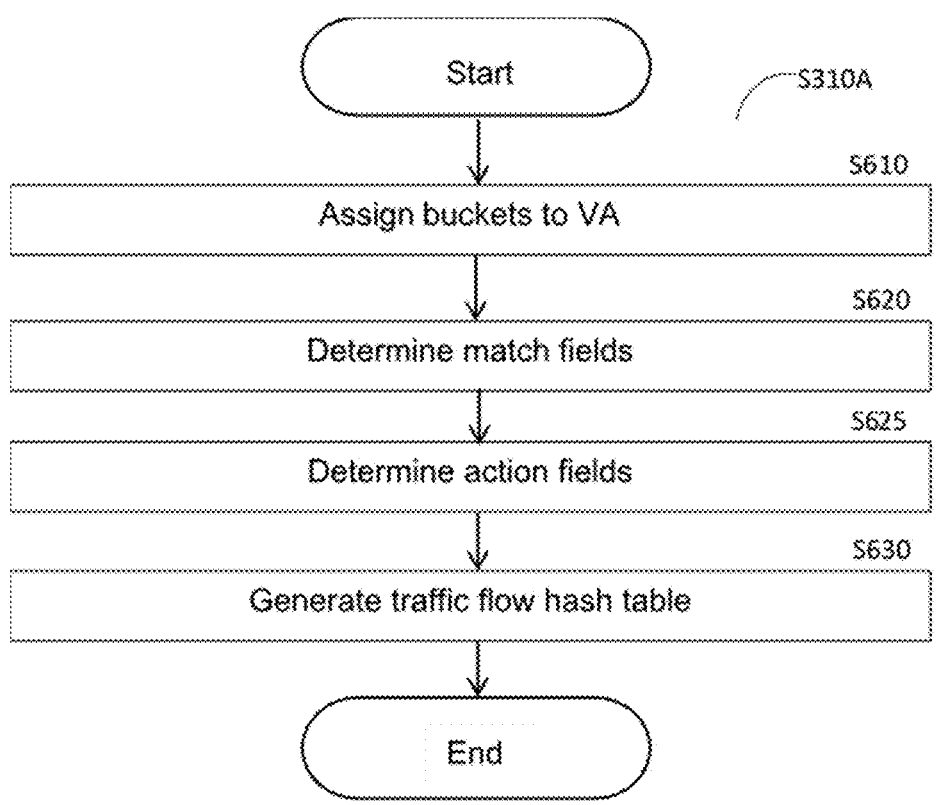
FIG. 6 is a flowchart illustrating a method for creating adaptive hash tables using direct mapping according to an embodiment.

FIG. 6 is a flowchart S310A illustrating a method for creating an adaptive hash table using direct mapping according to an embodiment. The adaptive hash table is for assigning traffic to VAs of one or more clusters (e.g., the ADC cluster 250) of an SDN-based network. In an embodiment, each cluster is assigned one or more matching conditions such as, e.g., destination virtual IP addresses (VIPs). In an embodiment, the method may begin in response to, e.g., receiving a request to create a hash table, determining a change in VAs or clusters of an SDN-based network (e.g., addition or removal of a VA and/or cluster), and the like. In another embodiment, the method may be performed automatically and in real-time based on changes in VAs and/or clusters. In an embodiment, the method is performed by a central controller, e.g., the controller 260.

At S610, one or more buckets is assigned to each VA based on the processing capacity of the VA. Each bucket represents a single table entry in the SDN-based network, and is associated with a capacity unit.

In an embodiment, S610 may further include computing a number of buckets for each cluster and distributing the computed numbers of buckets among VAs in each cluster according to their respective processing capacities. In a further embodiment, the number of buckets in a cluster i may be computed as:

$$\text{numberOfBuckets}_i = 2^{[log_2(FACTOR*MAXNUMOFCAPUNITS_i)]+1} \quad \text{Equation 1}$$

where MAXNUMOFCAPUNITS$_i$ parameter is the total number of capacity units associated with VAs of the cluster, and FACTOR is a predetermined factor (e.g., 8) which may be utilized to, e.g., ensure a sufficiently large number of buckets. In an embodiment, FACTOR may be a multiple of 2. In a further embodiment, FACTOR may be at least 2. As a non-limiting example, for a cluster with a total of 32 capacity units and a predetermined factor of 4, the number of buckets for the cluster is computed to be 256.

In yet a further embodiment, the mask size $n_i$ of a subnetwork mask may be computed as:

$$n_i = [log_2(FACTOR*MAXNUMOFCAPUNITS_i)]+1 \quad \text{Equation 2}$$

As a non-limiting example, for the cluster with a total of 32 capacity units and predetermined factor of 4, the least significant bits (LSB) mask will have 8 bits.

At S620, for each cluster, match fields for a set of flow entries are determined. Each match field may include, but is not limited to, a matching condition of a destination (e.g., a VIP) as well as a bucket hash value to be matched against the source address of incoming traffic. To this end, in an embodiment, S620 may further include computing a total number of flow entries. In an embodiment, the set of flow entries may include, for each distinct matching condition, a match field associated with each bucket assigned to VAs of the cluster. In a further embodiment, the number of flow entries required may computed as:

$$\text{numberOfFlowEntries} = 2 \times \Sigma_{i=1}^{nC} \Sigma_{m=1}^{nMC_i} \text{numberOfBuckets}_i \quad \text{Equation 3}$$

where nC is the total number of clusters and nMC$_i$ is the number of matching conditions for each cluster i. Determining the number of flow entries by doubling the computed total number of buckets allows for ensuring proper bi-directional distribution when any or all of the matching conditions are used both for source and destination addresses.

At S625, for each flow entry, an action field corresponding to the match field of the flow entry is determined. In an embodiment, each action field indicates that traffic is to be directed to a VA associated with the bucket of the match field. In a further embodiment, each action field may indicate direction of traffic based on, but not limited to, a MAC address of the VA (e.g., for a directly connected VA), a virtual port of the VA (e.g., for tunneling connections), and the like.

At S630, a traffic flow hash table is generated. The traffic flow hash table includes the computed total number of flow entries as well as the corresponding match fields and action fields. The generated traffic flow hash table allows for adapting to changes in the environment (e.g., addition, removal, failure, and/or resizing of one or more VAs). Specifically, such environment changes may be accommodated by re-allocating buckets to capacity units, thereby causing re-allocation of buckets to VAs.

Figure 7:
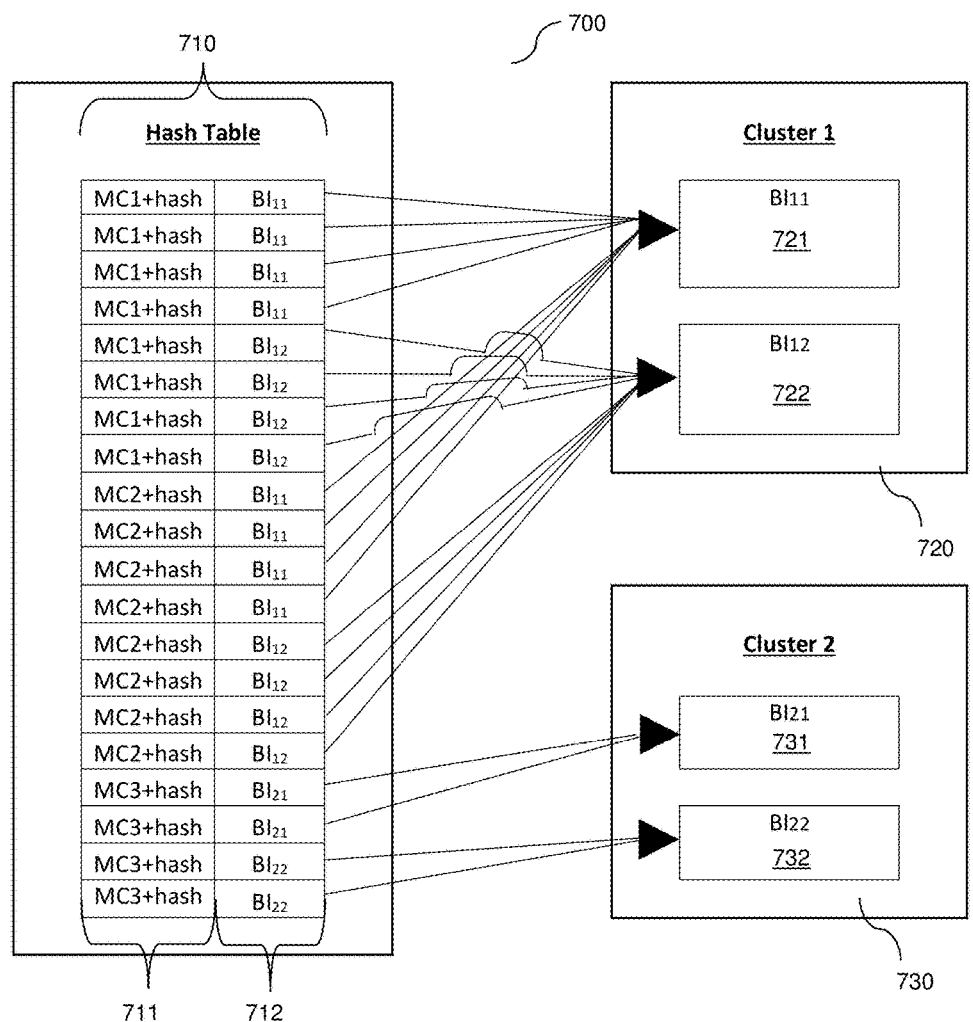
FIG. 7 is a mapping diagram illustrating hash tables created based on a direct mapping allocation.

FIG. 7 is a mapping diagram 700 illustrating direct allocation of traffic to VA buckets. The mapping diagram 700 features a traffic flow hash table 710 as well as two clusters 720 and 730. The traffic flow hash table 710 includes a plurality of match fields 711 and a plurality of action fields 712. Each of the match fields 711 indicates a matching condition (MC) as well as a bucket hash (hash) to be matched against source addresses of incoming traffic.

Each action field 712 indicates a bucket identifier (BI) of the bucket corresponding to each matching condition and hash combination. The bucket identifiers are assigned to the buckets 721 and 722 as well as 731 and 732 associated with cluster 1 720 and cluster 2 730, respectively. Each of the buckets 721 and 722 has double the capacity of each of the buckets 731 and 732. Thus, in an example, when the traffic flow hash table 710 is applied, incoming traffic is directed to one of the buckets 721, 722, 731, and 732 by matching the destination and source IP addresses or virtual IP addresses of the incoming traffic to the matching conditions and hash values, respectively, in the match fields 711.

Figure 8:
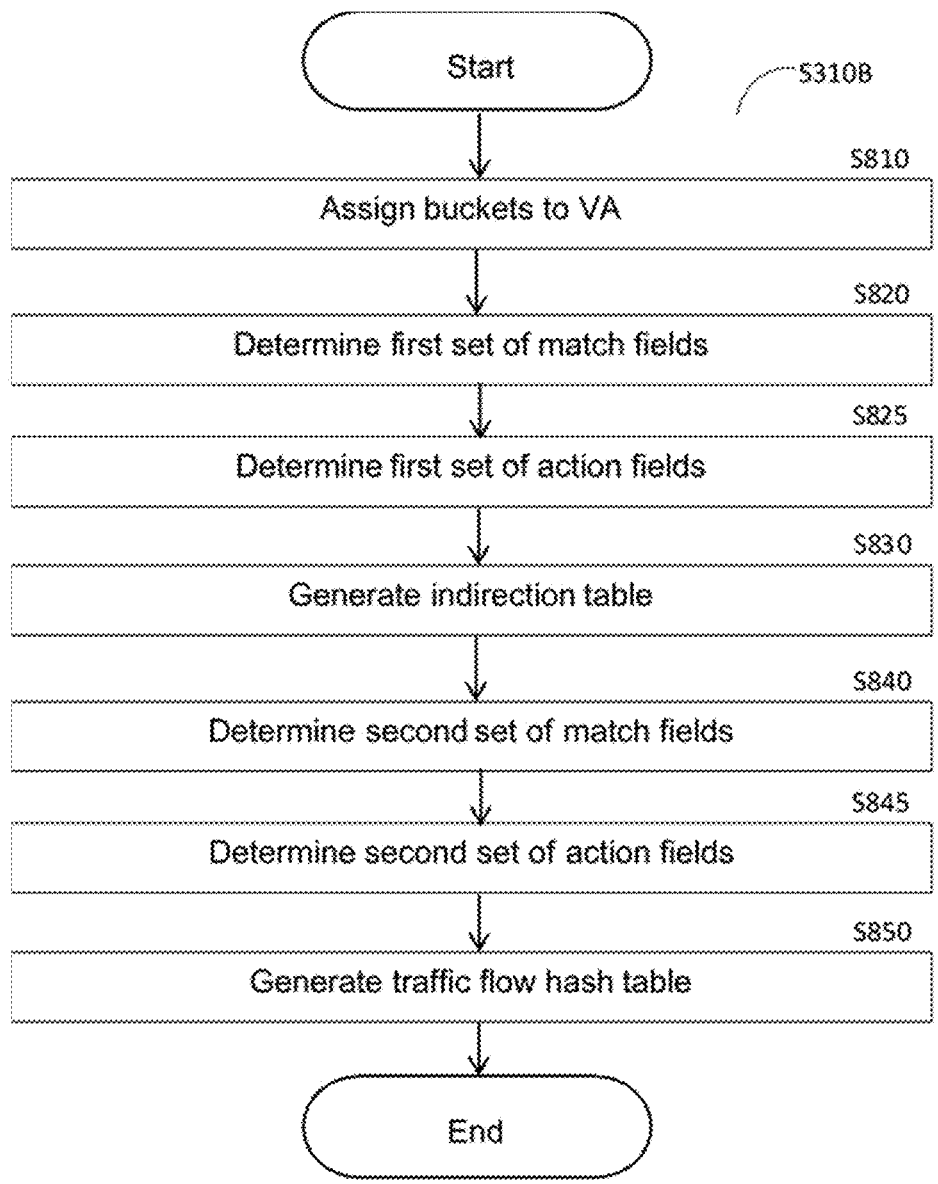
FIG. 8 is a flowchart illustrating a method for creating adaptive hash tables via a single indirection table according to an embodiment.

FIG. 8 is a flowchart S310B illustrating a method for creating an adaptive hash table utilized for directing traffic flow using a single indirection hash table according to an embodiment. The adaptive traffic flow hash table may be utilized for assigning traffic to VAs of one or more ADC clusters of an SDN-based network. In an embodiment, each cluster is assigned one or more matching conditions such as, e.g., destination virtual IP addresses (VIPs). In an embodiment, the method may begin in response to, e.g., receiving a request to create a hash table, determining a change in VAs or clusters of an SDN-based network (e.g., addition or removal of a VA and/or cluster), and the like. In another embodiment, the method may be performed automatically and in real-time based on changes in VAs and/or clusters. The method is performed by a central controller, e.g., the controller 260.

At S810, one or more buckets is assigned to each VA based on the processing capacity of the VA. Each assigned bucket represents a single table entry in the SDN-based network, and is associated with a basic capacity unit.

In an embodiment, S810 may further include computing a number of buckets for each cluster and distributing the computed numbers of buckets among VAs in each cluster according to their respective processing capacities. In a further embodiment, the number of buckets in a cluster i and a mask size may be computed according to equations 1 and 2, described further herein above with respect to FIG. 6.

At S820, a first set of match fields for entries of an indirection table is determined. In an embodiment, the first set of match fields includes one match field for each distinct matching condition.

At S825, a first set of action fields corresponding to the first set of match fields is determined. Each of the first set of action fields indicates a cluster identifier (ID) to be included in, e.g., metadata to be matched via the traffic flow hash table. Specifically, each action field may indicate the cluster ID of the cluster assigned to the corresponding matching condition.

At S830, an indirection table is generated. The indirection table includes the first sets of match and action fields. The indirection table may be a hash table utilized to screen incoming traffic based on, e.g., its destination, thereby reducing the number of flow entries required for a hash table. The reduced number of flow entries may reduce use of computing resources for storing flow entries as well as for re-allocating flow entries when changes (e.g., addition, removal, failure, and/or resizing of one or more VAs and/or clusters) in the environment occur. Specifically, in an embodiment, the indirection table allows different matching conditions to be associated with the same bucket.

At S840, a second set of match fields is determined. In an embodiment, S840 includes determining one or more match fields for each cluster. Each of the second set of match fields may include, but is not limited to, a cluster ID as well as a bucket hash value to be matched against the source address of incoming traffic. To this end, in an embodiment, S840 may further include computing a total number of flow entries for a traffic flow hash table. In an embodiment, the set of flow entries may include, for each distinct matching condition, a match field associated with each bucket assigned to VAs of the cluster.

In a further embodiment, the number of flow entries required may be computed as:

$$\text{numberOfFlowEntries} = 2 \times \Sigma_{i=1}^{nC} nMC_i + \text{numberOfBuckets}_i \quad \text{Equation 4}$$

where nC is the total number of clusters and $nMC_i$ is the number of matching conditions for each cluster i. Thus, as compared to the direct allocation method, the number of flow entries required for a single indirection table allocation method is typically reduced. This reduction may be further pronounced when the number of matchings conditions assigned to each cluster is high.

At S845, a second set of action fields is determined. In an embodiment, S845 includes determining, for each flow entry of the traffic flow hash table, an action field corresponding to the match field of the flow entry. Each of the second set of action fields indicates that traffic is to be directed to a VA associated with the bucket of the match field. In a further embodiment, each of the second set of action fields may indicate direction of traffic based on, but not limited to, a MAC address of the VA (e.g., for a directly connected VA), a virtual port of the VA (e.g., for tunneling connections), and the like.

At S850, a traffic flow hash table is generated. In an embodiment, the traffic flow hash table includes the computed total number of flow entries as well as the corresponding match fields and action fields of the second sets of match fields and action fields, respectively. The generated traffic flow hash table allows for adapting to changes in the environment (e.g., addition, removal, failure, and/or resizing of one or more VAs and/or clusters). Specifically, such environment changes may be accommodated by re-allocating buckets to capacity units, thereby causing re-allocation of buckets to VAs.

Figure 9:
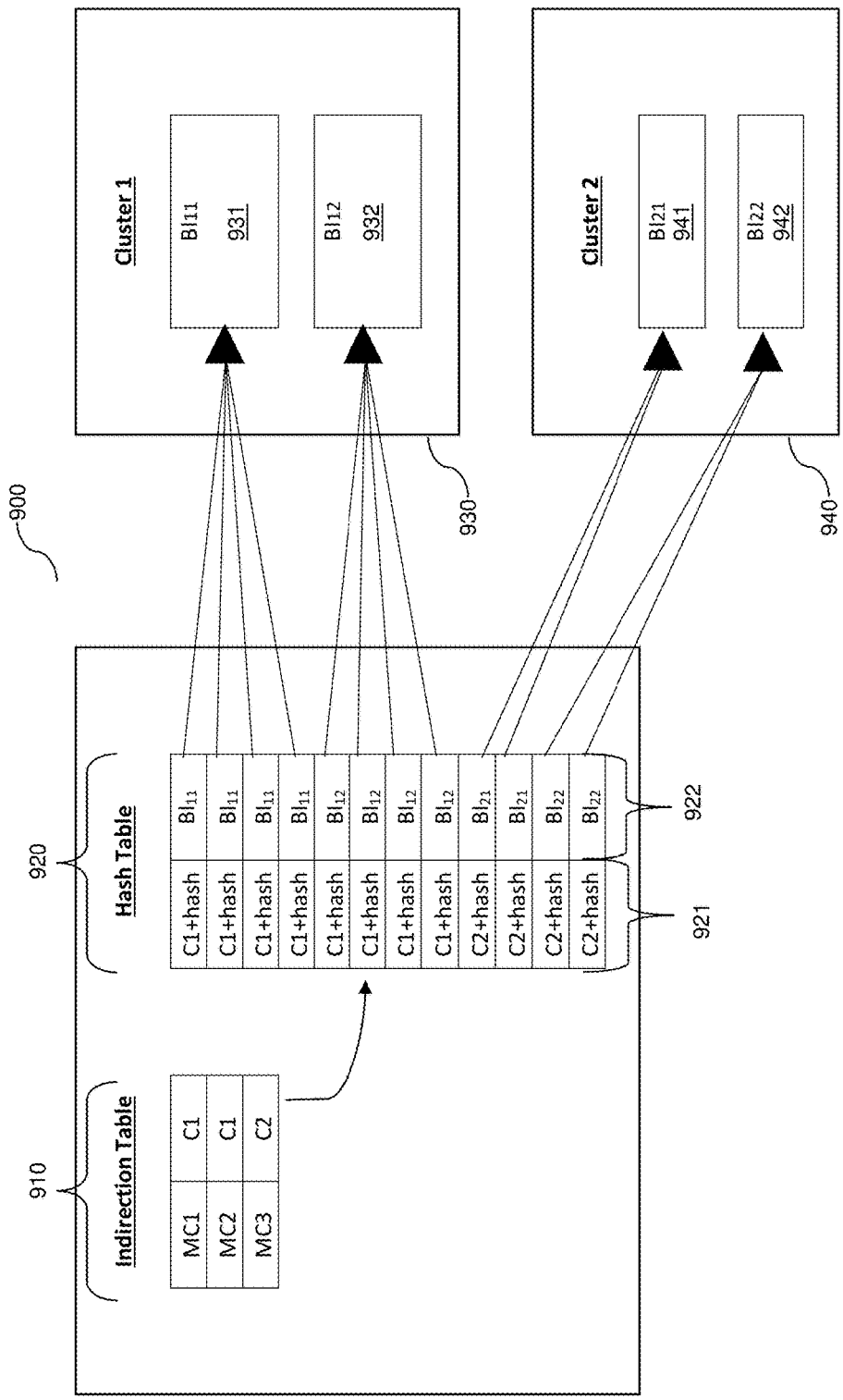
FIG. 9 is a mapping diagram illustrating hash tables created based on a single indirect mapping allocation.

FIG. 9 is a mapping diagram 900 illustrating an indirect allocation of traffic to VA buckets using a single indirection table. The mapping diagram 900 includes an indirection table 910, a traffic flow hash table 920, and two clusters 930 and 940.

The indirection table 910 includes a first plurality of match fields corresponding to a first plurality of action fields. Each of the first plurality of match fields indicates a matching condition (MC), while each of the first plurality of action fields indicates a corresponding cluster ID (C) to be included in, e.g., metadata for incoming traffic. The indirection table 910 may be utilized by matching destination IP addresses or virtual IP addresses to cluster IDs of the indirection table 910, thereby causing inclusion of cluster IDs in metadata for incoming traffic based on their destinations.

The traffic flow hash table 920 includes a second plurality of match fields 921 and a second plurality of action fields 922. Each of the second plurality of match fields 921 indicates a cluster ID (C) to be matched against metadata of incoming traffic as well as a bucket hash (hash) to be matched against source addresses of incoming traffic.

Each of the second plurality of action fields 922 indicates a bucket identifier (BI) of the bucket corresponding to each cluster ID and hash combination. The bucket identifiers are assigned to the buckets 931 and 932 as well as 941 and 942 associated with cluster 1 930 and cluster 2 940, respectively. Each of the buckets 931 and 932 has double the capacity of that of each of the buckets 941 and 942, respectively. Thus, in an example, when the traffic flow hash table 920 is applied, incoming traffic is directed to one of the buckets 931, 932, 941, or 942 by matching the determined cluster IDs and source IP addresses or virtual IP addresses of incoming traffic to the cluster IDs and hash values, respectively, in the match fields 921.

Figure 10:
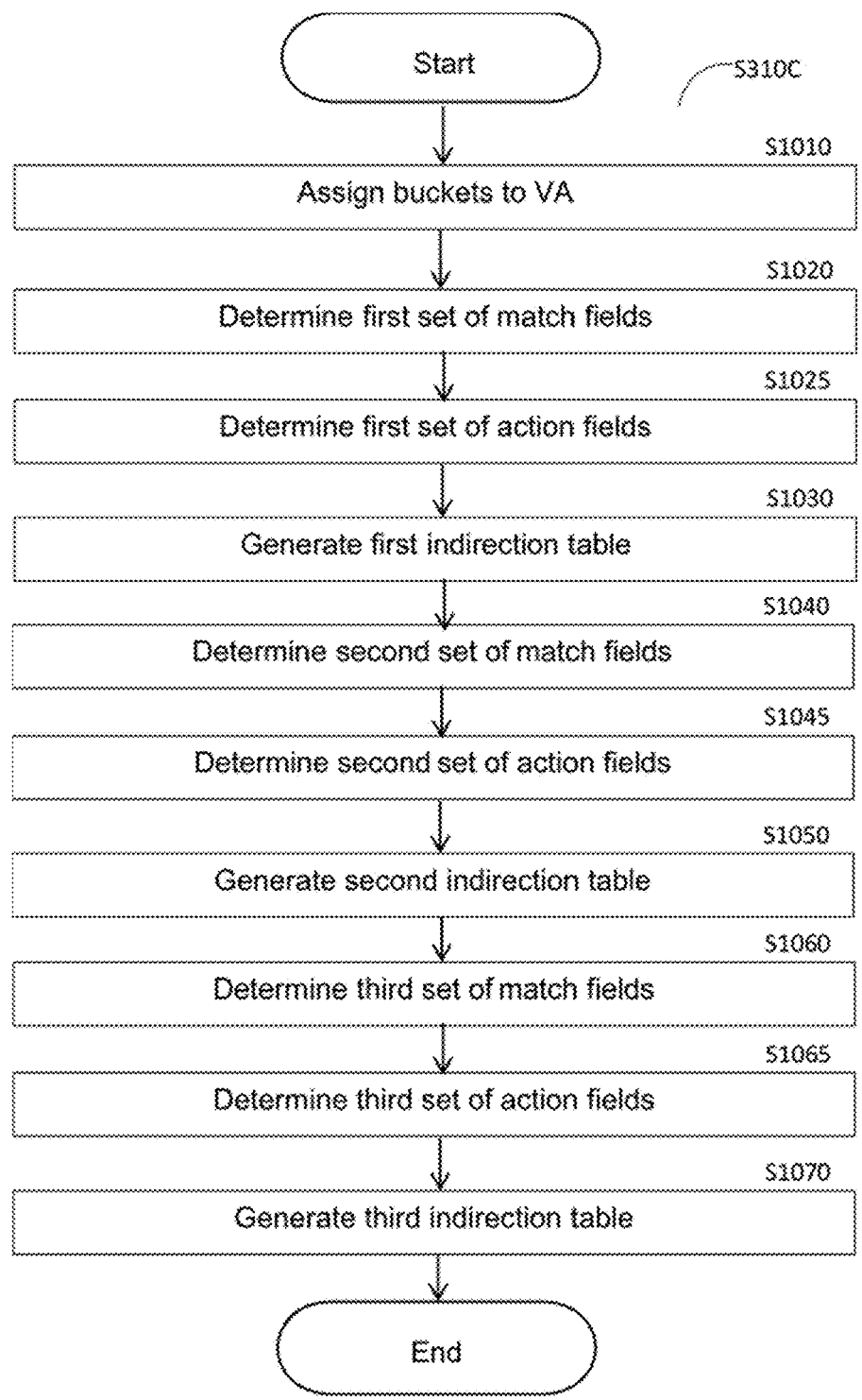
FIG. 10 is a flowchart illustrating a method for creating adaptive hash tables via two indirection tables according to an embodiment.

FIG. 10 is a flowchart S310C illustrating a method for creating an adaptive hash table for directing traffic flow using two indirection tables according to an embodiment. The adaptive traffic flow hash table is for assigning traffic to VAs of one or more ADC clusters of an SDN-based network. In an embodiment, each cluster is assigned a matching condition such as, e.g., a destination virtual IP address (VIP).

The method may begin in response to, e.g., receiving a request to create a hash table, determining a change in VAs or clusters of an SDN-based network (e.g., addition or removal of a VA and/or cluster), and the like. In another embodiment, the method may be performed automatically and in real-time based on changes in VAs and/or clusters. The method is performed by a central controller of the SDN-based network.

At S1010, one or more buckets is assigned to each VA based on the processing capacity of the VA. Each bucket represents a single table entry in the SDN-based network, and is associated with a basic capacity unit.

In an embodiment, S1010 may further include computing a number of buckets for each cluster and distributing the computed numbers of buckets among VAs in each cluster according to their respective processing capacities. In a further embodiment, the number of buckets in a cluster iand a mask size may be computed according to equations 1 and 2, described further herein above with respect to FIG. 6.

At S1020, a first set of match fields for entries of a first indirection table is determined. In an embodiment, the first set of match fields includes one match field for each distinct matching condition.

At S1025, a first set of action fields corresponding to the first set of match fields is determined. Each of the first set of action fields indicates information to be included in, e.g., metadata to be matched via the traffic flow hash table. In an embodiment, the information of the metadata may include the cluster ID of the cluster assigned to the corresponding matching condition as well as a current cluster size of the cluster. Specifically, each action field may indicate the cluster ID and current cluster size of the cluster assigned to the corresponding matching condition. In a further embodiment, the current cluster size may be the number of capacity units currently allocated to the cluster.

At S1030, a first indirection table is generated. The first indirection table includes the first sets of match and action fields. The first indirection table may be utilized to screen incoming traffic based on, e.g., the cluster size of its destination, thereby reducing the number of flow entries required for a hash table. The reduced number of flow entries may reduce use of computing resources for storing flow entries as well as for re-allocating flow entries when changes (e.g., addition or removal of a VA) in the environment occur.

At S1040, a second set of match fields for entries of a second indirection table is determined. In an embodiment, each of the second set of match fields includes a cluster size and a bucket hash value to be matched against a source address of incoming traffic. In a further embodiment, the second set of match fields includes a number of match fields based on the number of distinct cluster sizes and the number of distinct bucket hash values. The second indirection table is utilized to reduce the number of flow entries required for a hash table utilized when directing traffic.

At S1045, a second set of action fields corresponding to the second set of match fields is determined. Each of the second set of action fields indicates a member index to be included in, e.g., the metadata to be matched via the traffic flow hash table. In an embodiment, one member index may be utilized to determine which member (e.g., ADC) in the cluster to use. As an example, for a cluster size S, member index can be [0 . . . S−1].

At S1050, a second indirection table is generated. The second indirection table includes the second sets of match and action fields. The second indirection table may be utilized to classify incoming traffic based on the member index of each VA belonging to a cluster of a particular cluster size, thereby reducing the number of flow entries required for a traffic flow hash table. The reduced number of flow entries may reduce use of computing resources for storing flow entries as well as for re-allocating flow entries when changes (e.g., addition or removal of a VA) in the environment occur. Moreover, the first and second indirection tables allow buckets and corresponding hash tables to be reused by different clusters of the same cluster size.

At S1060, a third set of match fields is determined. In an embodiment, S1060 includes determining one or more match fields for each cluster. Each of the third set of match fields may include, but is not limited to, a cluster ID and a member index to be matched against the source address of incoming traffic. In an embodiment, the set of flow entries may include a match field for each distinct cluster ID and member index combination. Thus, in such an embodiment, the total number of flow entries may be determined as a function of the total cluster size of all distinct cluster sizes. As a non-limiting example, if cluster sizes of 2 and 8 are utilized, the number of flow entries may be determined as 10. As another non-limiting example, if cluster sizes of 2, 8, and 4 are utilized, the number of flow entries may be determined as 14. As yet another non-limiting example, if cluster sizes of 2, 8, 4, and 20 are utilized, the number of flow entries may be determined as 34.

As compared to the direct allocation method and the single indirection table method, the number of flow entries required for a double indirection table allocation method is typically reduced. This reduction may be further pronounced when the number of matchings conditions assigned to each cluster and/or the number of clusters currently having the same cluster size is high. Moreover, in an embodiment, the double indirection table method does not include pre-allocating flow entries based on a fixed maximum number of capacity units among clusters, thereby increasing flexibility.

At S1065, a third set of action fields is determined. In an embodiment, S1065 includes determining, for each flow entry, an action field corresponding to the match field of the flow entry. Each of the third set of action fields indicates that traffic is to be directed to a VA associated with a bucket having the cluster size and member index of the match field. In a further embodiment, each of the third set of action fields may indicate direction of traffic based on, but not limited to, a MAC address of the VA (e.g., for a directly connected VA), a virtual port of the VA (e.g., for tunneling connections), and the like.

At S1070, a traffic flow hash table is generated. The traffic flow hash table includes the computed total number of flow entries as well as the corresponding match fields and action fields. The generated traffic flow hash table allows for adapting to changes in the environment (e.g., addition, removal, failure, and/or resizing of one or more VAs or clusters). Specifically, such environment changes may be accommodated by adding or removing entries from the first indirection table (e.g., for any new or removed matching conditions) and/or by adding or removing flow entries from the traffic flow hash table (e.g., for each new or removed VA). An example addition of a cluster and corresponding accommodations using a double indirection allocation method is described further herein below with respect to FIGS. 11A-11B.

Figure 11A:
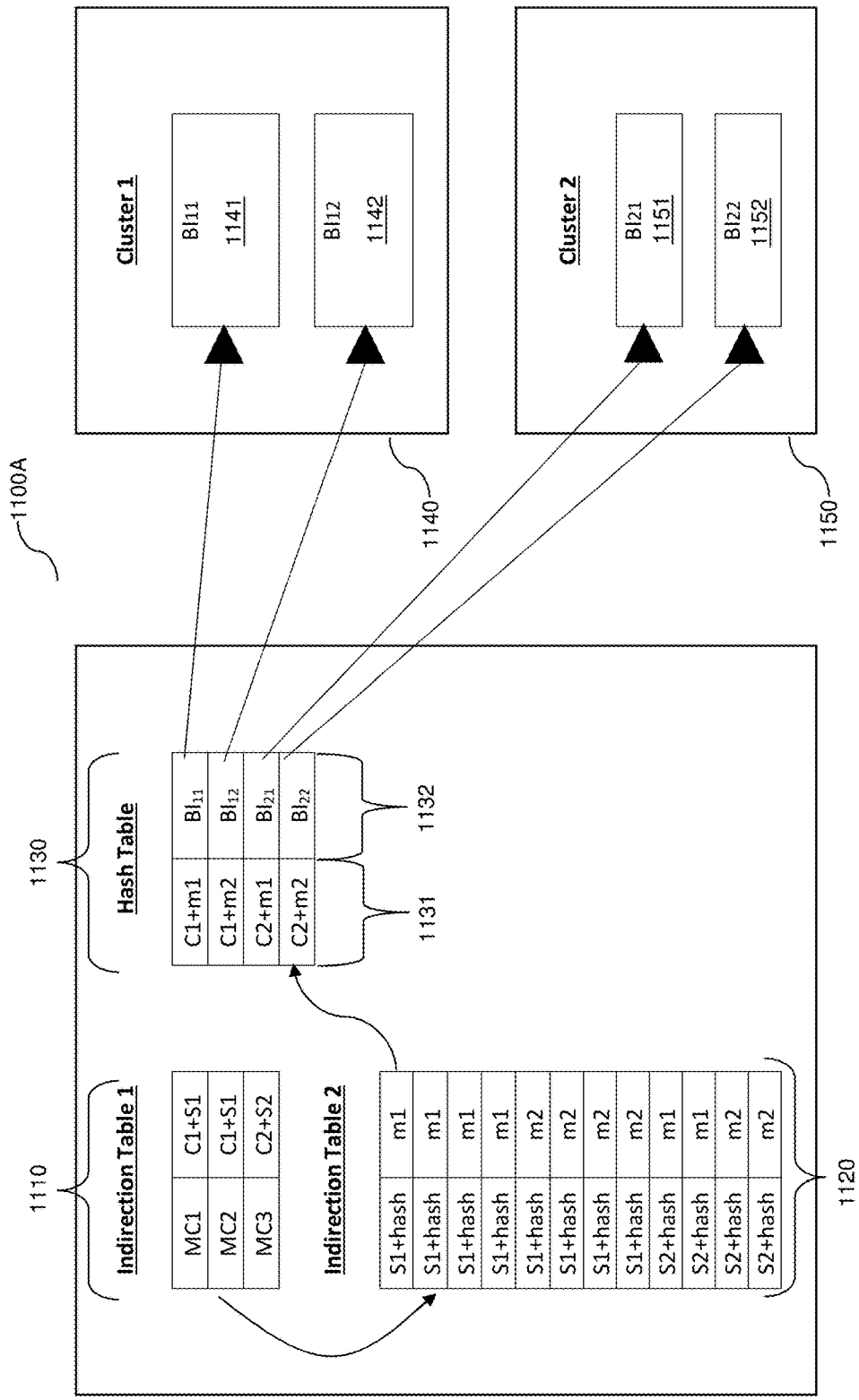
FIG. 11A is a mapping diagram illustrating hash tables created based on a double indirect mapping allocation.

FIG. 11A is a mapping diagram 1100A illustrating an indirect allocation of traffic to VA buckets using first and second indirection tables. The mapping diagram 1100A includes a first indirection table 1110, a second indirection table 1120, a traffic flow hash table 1130, and two clusters 1140 and 1150 including buckets 1141 and 1142 as well as 1151 and 1152, respectively.

The first indirection table 1110 includes a first plurality of match fields corresponding to a first plurality of action fields. Each of the first plurality of match fields indicates a matching condition (e.g., a destination IP or VIP address), where each match field corresponds to a cluster indicated by its cluster ID (C) and cluster size (S). Each of the first plurality of action fields indicates a cluster ID and cluster size to be included in, e.g., metadata of the incoming traffic. The first indirection table 1110 may be utilized by matching destination IP addresses or virtual IP addresses to cluster IDs and cluster sizes of the first indirection table 1110, thereby causing inclusion of cluster IDs and cluster sizes in metadata of incoming traffic based on their destinations.

The second indirection table 1120 includes a second plurality of match fields corresponding to a second plurality of action fields. Each of the second plurality of match fields indicates a cluster size to be matched against metadata of incoming traffic as well as a bucket hash value to be matched against a source address of incoming traffic. Each of the second plurality of action fields indicates a member index (m) to be included in, e.g., metadata of the incoming traffic. The second indirection table 1120 may be utilized by matching the cluster size and bucket hash value determined for incoming traffic to a member index, thereby causing inclusion of member indices in metadata for the incoming traffic.

The traffic flow hash table 1130 includes a third plurality of match fields 1131 corresponding to a third plurality of action fields 1132. Each of the third plurality of match fields 1131 indicates a cluster ID to be matched against metadata of incoming traffic as well as a member index to be matched against metadata of the incoming traffic.

Each of the third plurality of action fields 1132 indicates a bucket identifier (BI) of the bucket corresponding to each cluster ID and member index combination. The bucket identifiers are assigned to the buckets 1141 and 1142 as well as 1151 and 1152 associated with cluster 1 1140 and cluster 2 1150, respectively. Thus, in an example, when the traffic flow hash table 1130 is applied, incoming traffic is directed to one of the buckets 1141, 1142, 1151, or 1152 by matching the determined cluster IDs and determined member indices of incoming traffic to the cluster IDs and hash values, respectively, in the match fields 1131.

Figure 11B:
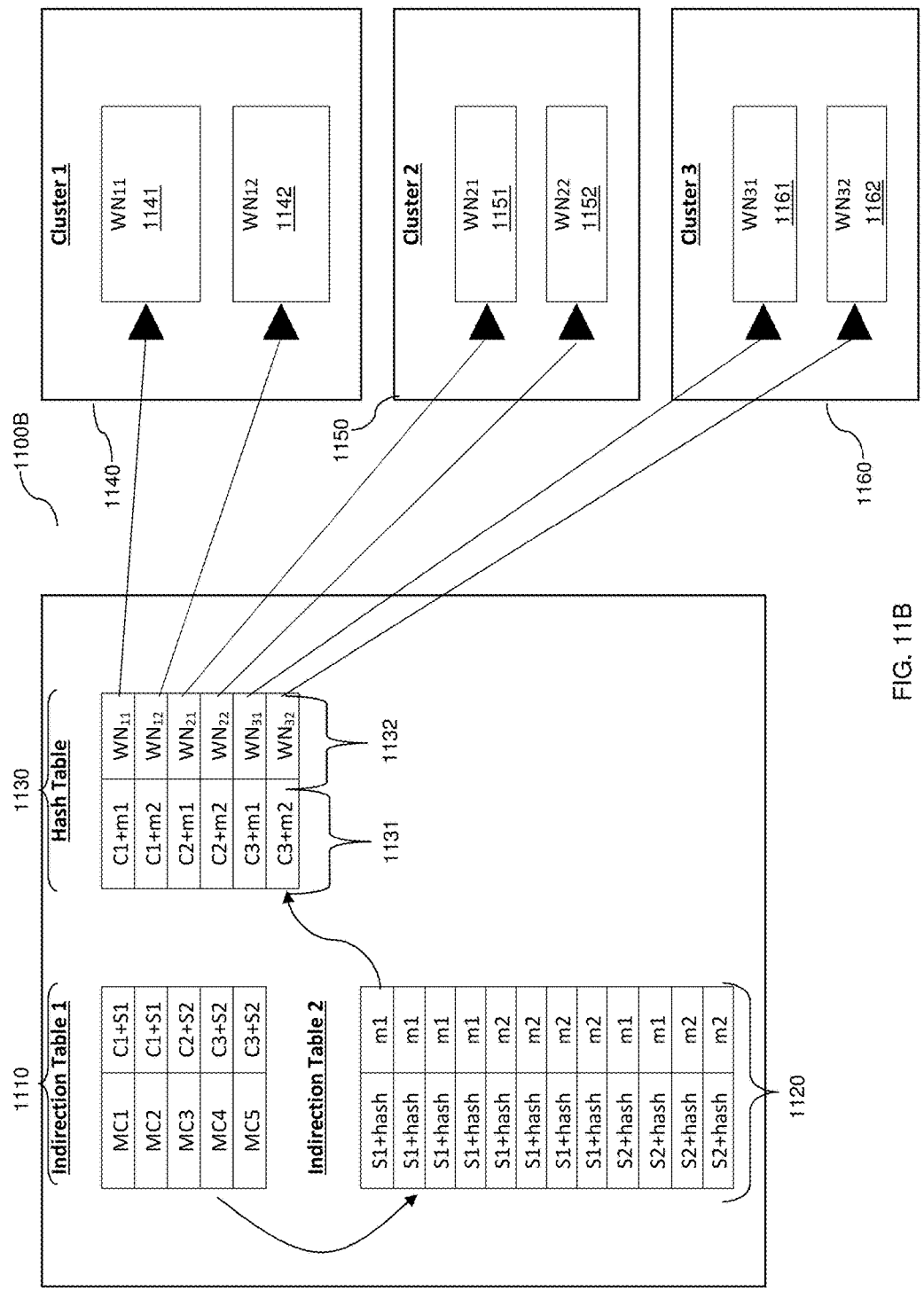
FIG. 11B is a mapping diagram illustrating hash tables modified to accommodate added clusters.

FIG. 11B is a mapping diagram 1100B illustrating accommodating a newly added cluster by the traffic flow hash table of FIG. 11A. In the example mapping diagram 1100B, a new cluster 3 1160 has been added. The cluster 3 1160 includes a bucket 1161 and a bucket 1162. The buckets 1161 and 1162 have the same capacities as those of the buckets 1151 and 1152.

To accommodate the new cluster 1160, two new entries are added to each of the first indirection table 1110 and the traffic flow hash table 1130. The two new entries in the first indirection table 1110 account for two new matching conditions MC4 and MC5, while the two new entries in the traffic flow hash table 1130 account for two new VAs assigned to buckets BI$_{31}$ and BI$_{32}$, respectively.

It should be noted that the mapping diagrams described herein with respect to FIGS. 7, 9, and 11A-11B are merely examples and do not limit any of the disclosed embodiments. In particular, the mapping diagrams may be applied to various numbers of clusters, matching conditions, and/or buckets without departing from the scope of the disclosure. Moreover, buckets and/or clusters of varying capacities and/or cluster sizes, respectively, may be utilized without departing from the scope of the disclosure.

It should be further noted that the embodiments disclosed herein are not limited to OpenFlow protocol and OpenFlow-based network elements (switches), but can be adapted to support any SDN types of protocols and network elements.

The foregoing detailed description has set forth a few of the many forms that different disclosed embodiments can take. It is intended that the foregoing detailed description be understood as an illustration of selected forms that the embodiments can take and not as a limitation to the definition of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for managing an application delivery controller (ADC) cluster including a plurality of ADCs, comprising:
    creating a hash table including a plurality of buckets, wherein a number of the plurality of buckets is a multiple of a maximum number of active ADCs that can be supported by the ADC cluster;
    allocating, to each active ADC of the ADC cluster, one of the plurality of buckets; and
    instructing at least one network element to distribute traffic to and from the active ADCs based on the hash table.

2. The method of claim 1, further comprising:
    monitoring load on the ADC cluster;
    determining, based on the monitoring, whether to change a configuration of the ADC cluster; and
    changing, based on the determination, the configuration of the ADC cluster to a new configuration, wherein changing the configuration of the ADC cluster includes any of: adding at least one ADC to the ADC cluster, and removing at least one ADC from the ADC cluster.

3. The method of claim 2, further comprising:
upon changing the configuration of the ADC cluster, modifying the hash table based on the new configuration.

4. The method of claim 3, further comprising:
reallocating the plurality of buckets based on the modified hash table.

5. The method of claim 4, further comprising:
instructing the at least one network element to distribute traffic to and from the active ADCs based on the modified hash table.

6. The method of claim 2, wherein determining whether to change the configuration of the ADC cluster further comprises:
determining, based on the monitoring, whether a current average load of the ADC cluster is any of: above a predefined peak threshold, and below a predefined low threshold;
upon determining that the current average load is above the predefined peak threshold, determining that at least one ADC should be added to the ADC cluster; and
upon determining that the current average load is below the predefined low threshold, determining that at least one ADC should be removed from the ADC cluster.

7. The method of claim 2, further comprising:
configuring at least one of the plurality of active ADCs with at least one persistency rule for preserving persistency after changes in the configuration of the ADC cluster.

8. The method of claim 2, wherein the hash table is created based on at least one indirection.

9. The method of claim 8, further comprising:
generating at least one indirection table, wherein each indirection table is utilized to classify incoming traffic; and
upon changing the configuration of the ADC cluster, adding or removing at least one entry in the at least one indirection table.

10. The method of claim 1, wherein instructing the at least one network element to distribute traffic to and from the active ADCs based on the hash table further comprises:
configuring at least one ingress network element to send each incoming packet from a client to one of the active virtual ADCs based on a source address of the clients, wherein each incoming packet corresponds to an outgoing packet; and
configuring at least one egress network element to send each outgoing packet from a server to the virtual ADC that received a corresponding incoming packet.

11. The method of claim 1, wherein the multiple is a multiple of two.

12. The method of claim 1, further comprising:
computing a number of buckets for each ADC in the cluster based on the processing capacity of the ADC relative to processing capacities of the plurality of ADCs.

13. The method of claim 1, wherein the hash table is created via direct mapping.

14. A system for managing an application delivery controller (ADC) cluster including a plurality of ADCs, comprising:
a processing unit; and
a memory connected to the processing unit, the memory containing instructions that, when executed by the processing unit, configure the system to:
create a hash table including a plurality of buckets, wherein a number of the plurality of buckets is a multiple of a maximum number of active ADCs that can be supported by the ADC cluster;
allocate, to each active ADC of the ADC cluster, one of the plurality of buckets; and
instruct at least one network element to distribute traffic to and from the active ADCs based on the hash table.

15. The system of claim 14, wherein the system is further configured to:
monitor load on the ADC cluster;
determine, based on the monitoring, whether to change a configuration of the ADC cluster; and
change, based on the determination, the configuration of the ADC cluster to a new configuration, wherein changing the configuration of the ADC cluster includes any of: adding at least one ADC to the ADC cluster, and removing at least one ADC from the ADC cluster.

16. The system of claim 15, wherein the system is further configured to:
upon changing the configuration of the ADC cluster, modify the hash table based on the new configuration.

17. The system of claim 16, wherein the system is further configured to:
reallocate the plurality of buckets based on the modified hash table.

18. The system of claim 17, wherein the system is further configured to:
instruct the at least one network element to distribute traffic to and from the active ADCs based on the modified hash table.

19. The system of claim 15, wherein the system is further configured to:
determine, based on the monitoring, whether a current average load of the ADC cluster is any of: above a predefined peak threshold, and below a predefined low threshold;
upon determining that the current average load is above the predefined peak threshold, determine that at least one ADC should be added to the ADC cluster; and
upon determining that the current average load is below the predefined low threshold, determine that at least one ADC should be removed from the ADC cluster.

20. The system of claim 15, wherein the system is further configured to:
configure at least one of the plurality of active ADCs with at least one persistency rule for preserving persistency after changes in the configuration of the ADC cluster.

21. The system of claim 15, wherein the hash table is created based on at least one indirection.

22. The method of claim 21, wherein the system is further configured to:
generate at least one indirection table, wherein each indirection table is utilized to classify incoming traffic; and
upon changing the configuration of the ADC cluster, add or remove at least one entry in the at least one indirection table.

23. The system of claim 14, wherein the system is further configured to:
configure at least one ingress network element to send each incoming packet from a client to one of the active virtual ADCs based on a source address of the clients, wherein each incoming packet corresponds to an outgoing packet; and configure at least one egress network element to send each outgoing packet from a server to the virtual ADC that received a corresponding incoming packet.

24. The system of claim 14, wherein the multiple is a multiple of two.

25. The system of claim 14, wherein the system is further configured to:

compute a number of buckets for each ADC in the cluster based on the processing capacity of the ADC relative to processing capacities of the plurality of ADCs.

26. The system of claim 14, wherein the hash table is created via direct mapping.

* * * * *